219-121 SR
10/7/80 OR 4,227,065

United States Patent [19]

[11] 4,227,065

Paradi et al.

[45] Oct. 7, 1980

[54] METHOD OF JOINING CURRENT CONDUCTING COMPONENTS OF WAVE GUIDE ELEMENTS AND PRODUCING OF THE SAME

[75] Inventors: Laszlo Paradi; Miklos Acs; Tibor Szücs; Tibor Konkoly, all of Budapest, Hungary

[73] Assignee: Finommechanikai Vallalat, Budapest, Hungary

[21] Appl. No.: 837,883

[22] Filed: Sep. 29, 1977

[30] Foreign Application Priority Data

Sep. 30, 1976 [HU] Hungary ............................ PA 1263

[51] Int. Cl.[2] ................................................ B23K 9/00

[52] U.S. Cl. .................... 219/121 EM; 219/121 LM; 219/121 P

[58] Field of Search ................. 219/121 EM, 121 EB, 219/121 RM, 121 L, 121 P

[56] References Cited

U.S. PATENT DOCUMENTS

| | | | |
|---|---|---|---|
| 3,417,223 | 12/1968 | Steigerwald | 219/121 EM |
| 3,663,794 | 5/1972 | Cachard | 219/121 EM |
| 3,694,616 | 9/1972 | Brealey | 219/121 EB |
| 3,949,186 | 4/1976 | Nakayama | 219/121 EM |

*Primary Examiner*—C. L. Albritton
*Attorney, Agent, or Firm*—Karl F. Ross

[57] ABSTRACT

A wave guide is formed from a plurality of internally coated plates whose internal coating forms the current-conducting surfaces of the wave guide. The plates are welded together, their corners being welding beams trained through one of the plates at a location offset from the coatings to form a melt which bridges each pair of plates to fuse them together. Preferably the energy causes some melting and fusion of the coatings to braze the adjacent coatings together.

8 Claims, 8 Drawing Figures

METHOD OF JOINING CURRENT CONDUCTING COMPONENTS OF WAVE GUIDE ELEMENTS AND PRODUCING OF THE SAME

FIELD OF THE INVENTION

The invention relates to a method of joining current-conducting components of wave-guide elements and to the production of such elements.

BACKGROUND OF THE INVENTION

Because of the strictness of different electrical and mechanical requirements, the production of wave-guide elements, especially cavities and filters of rectangular wave guides, represents a highly laborious process being consumptive of time, material and machine capacity.

The contradictory mechanical and electrical requirements are due to the fact that on the inner conducting surfaces of the finished wave-guide element should have a continuous electroplated coating of high-grade surface finish preferably of noble metals (Ag, Au, Pd), positioning of the components should be kept within strict limits of tolerance, formation of a continuous tight electroplated coating between the current-conducting surfaces joined is imperative, but yet perfect compensation of thermal expansions should be provided for.

In production technologies used up to now the inner continuous electroplated coating of uniform thickness has been formed after the wave guide element was given its final form. Formation of an inner layer of uniform thickness inside the rectangular wave guide provided with corners, projections and transverse iris plates and rods, however, proved to be nearly impossible in practice. In order to perform suitable electroplating, inner equipotential surfaces ought to be formed, but due to the hollow form closed on all sides, formation of equipotential surfaces is impossible. As a consequence, to achieve the desired thickness even in the most unfavorable places, e.g. in corners, thicknesses of noble metal are electroplated, the thickness of which are 10–20 times greater than needed. This also applies to priming galvanic coatings, e.g. copper, under the noble metal coatings. The process mentioned results in significant consumption of noble metals, and taken up electroplating equipment capacity for an unnecessary long period.

In order to comply with the requirement of continuous and smooth inner surface, in the course of producing wave-guide elements, the number of joining operations is minimized.

The wave guides can be made of tubes having different profiles (e.g. circle, ellipse or rectangle or combination thereof same) in which highly accurate slots are machined for the fitting of the transverse iris plates. In the course of mechaning, the inner surfaces of the cavities must remain absolutely free from burrs. In case burrs appear they must be removed without scratching the inner surface. Difficulties in production are increased by the fact that in order to lessen thermal expansion the parts are made of metals having a low thermal expansion coefficient, advantageously of a alloy containing 36% nickel and 64% iron, requiring special bonding technology.

Iris plates are fixed in such a manner that between the inner surface of the tube and the current-conducting surfaces of the iris plates a continuous metallic bond is established. Up to now this requirement could not be complied with. Most frequently brazing with alloys containing silver are performed. With such brazing, it can not be totally ensured that the brazing alloy will fill up all gaps. Simultaneously excessive flow of the melted alloy into the inside of the tube should be avoided.

Furthermore because of the closed inner space, the control of the joint quality of brazed wave-guide elements is practically impossible.

For the reasons enumerated and because of the oxidizing, deforming and surface-roughening effects of conventional welding methods, welding technology has not been used up to now for the assembly of wave-guide elements.

OBJECTS OF THE INVENTION

It was the object of the invention to provide a method for joining the current-conducting components of wave guide elements, simultaneously eliminating the drawbacks enumerated and to facilitate high rate production of such elements.

Another object is to join components in such manner that between the inner current conducting surfaces, even if they are previously electroplated in a final form, a final and accurately controllable continuous joint should be established.

SUMMARY OF THE INVENTION

The invention is based on our discovery that the technology for producing microwave components can be facilitated only by using an absolutely new and radically different joining method in this field.

For joining the current-conducting components of the wave-guide elements a new method is provided which enables the bonding of components electroplated in final form, since difficulties of electroplating of closed inner surfaces can be eliminated only in this way. When the new method is used, the inner surfaces are not damaged nor are the electrical and/or mechanical properties of the joined components detrimentally altered. The method is able to establish a tight continuous electric connection between the current-conducting components joined without increasing the attenuation of the wall currents propagating in the surface layer. It is also important that the method is performed from the outside, since otherwise the inner surface of the wave guides closed on all sides cannot be connected to the surfaces of other inner elements, e.g. iris plates or rods.

When applying the method according to the invention, the components to be joined are fitted together and kept in their final relative position within the wave guide. Then the components are welded together generally from the outside, through the outwardly disposed element, by directing an energy beam towards the fitting surfaces by, using a welding beam such as a plasma beam, electron beams or laser beam.

The beam energy can be concentrated in a small area, usually not exceeding some hundredths of a $mm^2$; the beam-power density exceeds by several orders of magnitude that of conventional arc welding and therefore the welded parts are deformed only slightly. By beam welding complete fusion can be established between the surface layers of current-conducting components fitted together.

Parameters of beam-welding technologies can be accurately adjusted, they can be continuously controlled, and the beam can be guided along the path desired with a high accuracy.

Beam welding can be performed very cleanly, since no contaminants are mixed into the melt pool; joint filling is not required and the process can take place in high-vacuum, thus eliminating pollution from the environment; formation of an oxide-layer does not occur, and, as a consequence, the microwave properties are not changed.

When the process is performed with elements provided with electroplated surfaces, the electroplated coating consisting of a copper layer with a silver layer applied thereon, the plated coatings beside the welding fusion zone will fuse together and a joint having a brazed-bond character will be established. The joint reaches with the correct choice of welding parameters and place of weld to the fitted current conducting surfaces.

In a preferred method of the invention, wave-guide elements can be assembled in several stages. The component parts and in a given case the rectangular wave guides are made of metal plates having at least partly galvanized surfaces. In the course of the process the iris plates or rods are placed between the opposite broad faces of the rectangular wave guide into their final positions and welded through the face plates by using the beam-welding technology described earlier. After having adjusted the narrow face plates of the rectangular wave guide to their final position, the plates are welded into a rectangular wave-guide shape by using the beam-welding technique.

By the use of the method according to the invention, the production of wave-guide elements is facilitated, since the parts can be electroplated in the form of plates; assembling of the parts does not require close tolerance milling of slots and the use of expensive precision tubes with a rectangular cross-section becomes superfluous. Compared to known brazing processes, the joints produced by beam-welding technique result in more reliable electrical connections than with earlier systems.

By applying the method according to the invention, valuable noble metals, machine capacity and manpower can be spared; simultaneously improvement of the parameters of the wave-guide elements is possible.

SPECIFIC DESCRIPTION

Figure 1:
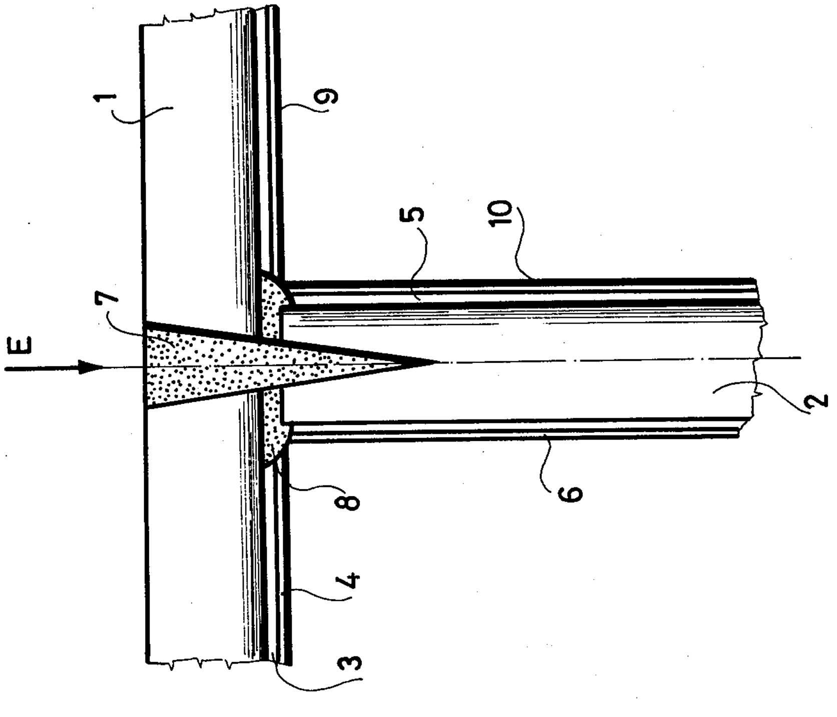
FIG. 1 is a diagrammatic elevation which shows two components previously electroplated being joined by using the method according to the invention, the electroplated coatings being shown in an exaggerated scale.

In FIG. 1 the components 1 and 2 joined by using the method according to the invention have been illustrated. Preferably both components are made of sheet metal of low thermal expansion coefficient coated with a double plated layer. The lower layers 3 and 5 are made of copper, the upper ones 4 and 6 of silver. Advantageously the proportion of the thicknesses of the single coatings are chosen so that the thickness of the copper coating should amount to approx. 2–8 times that of the silver coating.

The joint shown in FIG. 1 is formed in such manner way that the two elements are fitted together in the position illustrated and placed in the vacuum chamber of an electron-beam welding machine, to its work table. The electron beam is directed through the plate 1 in the direction of the arrow E, onto the fitting surface of the plates. The energy of the electron beam produces a slightly conical pool 7 of molten metal, by which plates 1 and 2 are welded. Beside the melt 7 temperature zones with continuously decreasing temperatures appear. By proper choice of welding parameters coatings 3, 4, 5, and 6 will melt and bonds 8 with a brazed character can be produced between the plates 1 and 2 on both side of weld joint 7. The extension of the zones of brazing 8 is adjusted so that it reaches up to the contact lines of the welding plates 1 and 2. This requirement has to be complied with at least between the current conducting surfaces joined so that the contact line of the current-conducting surfaces, e.g. between the surfaces 9 and 10, provides a perfect electrical connection.

Within the microwave frequency range every gap falling in the path of wall currents may cause attenuation; consequently avoiding attenuation is of the utmost importance.

In the course of welding, the elements 1 and 2 are advantageously pressed together. The pressure applied depends on the thickness of the plates 1, 2 and generally is between 50 and 400 $N/cm^2$. By means of the pressure applied, smaller unevennesses between the surfaces fitted (e.g. deviation of the plates from the plain) can be compensated.

The parameters of electron beam welding, i.e. accelerating voltage, beam current and welding speed may be adjusted according to the dimensions of the plates 1, 2. Supposing that the thickness of the plate 1 is 3 mm and that of the plate 2 equals 2 mm, the thickness of the copper coating being 25 $\mu$m and that of the silver layer 4 $\mu$m; after having adjusted the accelerating voltage to 100 kV, beam current to 12 mA and welding speed to 3 cm/s, the joint illustrated in FIG. 1 can be achieved. In this case the pressure applied between the plates amounts to 100 $n/cm^2$, and the vacuum pressure is $1.10^{-4}$ bar.

Values differing from those mentioned above may be also chosen. In the case of higher welding speed power of the electron beam may also be increased.

Figure 2:
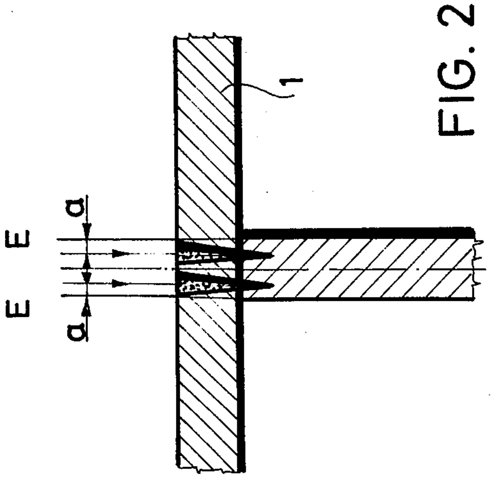
FIG. 2 is a diagrammatic section which shows a joint provided with a double weld.

In FIG. 2 the formation of a double weld has been illustrated. In this case the beam power can be decreased, leaving the thickness of the plates unaltered. A double weld may be required, when both sides of the plate 2 are participating in wall current propagation.

In case if the thickness of the plate 1 is less, than that of the plate 2, or if we do not intend to form too large a weld in order to avoid mechanical deformation, welded joints may be formed by the expedient control of the electron beam in a certain distance a from each of the current conducting surfaces of plate 2. The distance a is to be selected in such a manner that the brazing zone formed should reach up to the touching line of current conducting surfaces.

Figure 3:
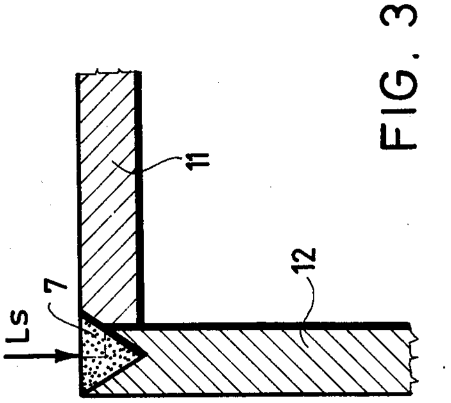
FIG. 3 is a view similar to FIG. 2 which illustrates the formation of the corner weld.

In FIG. 3 the joint between two plates 11, 12 is fitted in a right angle, formed by using laser welding technique has been illustrated. Propagation wave takes place at the inner surfaces. Welding is performed in such a way that the two plates are fitted together in their desired final position, and a laser beam is directed onto the joining surfaces. The direction of the beam is indicated by the arrow Ls. When performing this kind of welding, a vacuum environment is not imperative, the use of a protective atmosphere also complies with requirements. In order to improve fitting of plates, L-profiles were formed. Taking a plate thickness of 3 mm as a basis, advantageous parameters of the laser beam welding technique are as follows: Wave length of continuous radiation (with a $CO_2$-laser) 10.8 μm, beam power 2 kW welding speed 1.5 cm/s.

In FIGS. 2 and 3 the electroplated coatings of the plates are not separately illustrated.

When making the joint according to the invention, previous formation of an electroplated coating may be omitted, but the coating already deposited will not be damaged by the beam welding technology. At the assembly of wave guide elements subsequent electroplating may seem advantageous, as long as electroplating of the current conducting surfaces does not cause difficulties.

Power density of beam welding technologies is so high that within a short distance from the melt pool the plates due to lack of time, will not warm up, consequently deformation arising in course of the welding process may be disregarded.

By using the method according to the invention, production of wave guide elements can be considerably facilitated, since said components can be assembled from pre-galvanized plates, mounted step by stem into their final form. The process will be described in details by means of the FIGS. 4–7.

Figure 4:
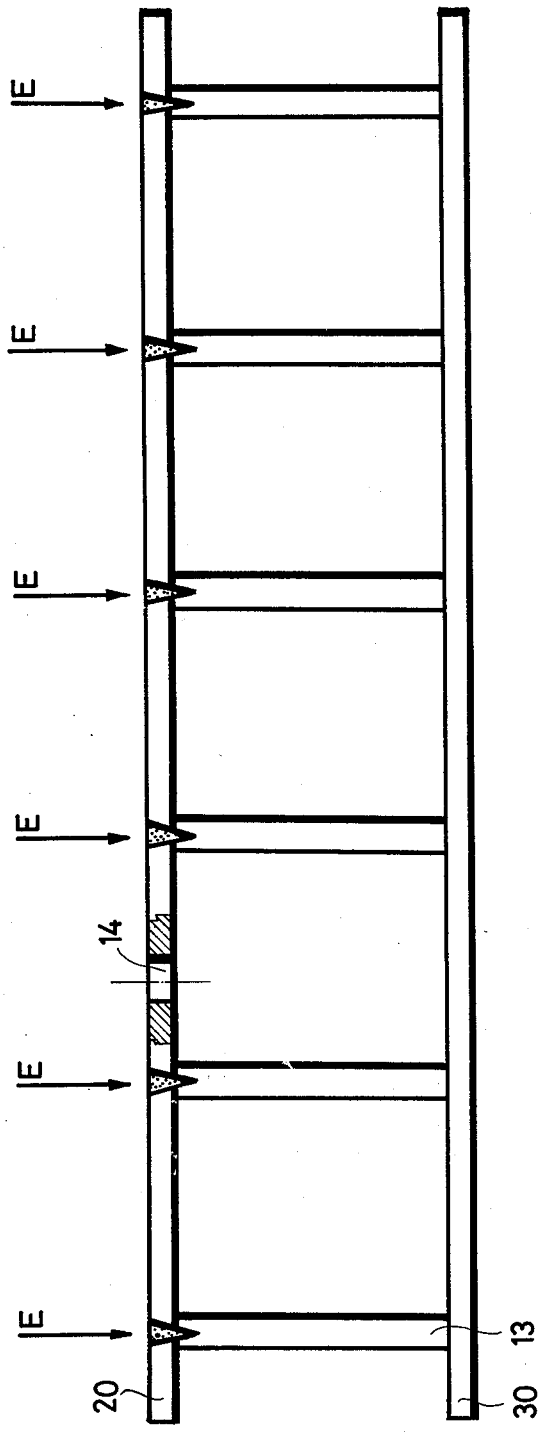
FIG. 4 is a diagram which shows the production of a microwave filter in the first stage of assembly.
Figure 6:
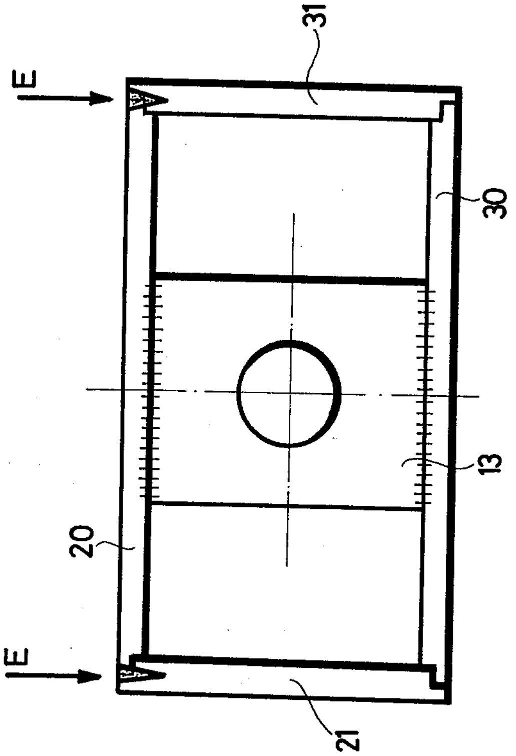
FIG. 6 is a side view of the next stage of assembly according to FIG. 5 (side-view)
Figure 5:
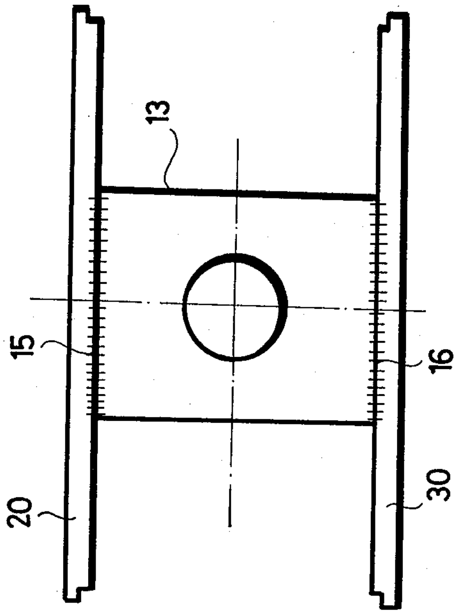
FIG. 5 is a side view of the semi-finished unit of FIG. 4; after welding.

In FIG. 4 the first phase of production of microwave filters has been illustrated. The microwave filter consists of iris plates and tuning screws arranged in suitable places within the rectangular wave guide.

The rectangular wave guide is made of four oblong plates 20, 21, 30 and 31. Said plates, as well as the iris plates 13 are made of metal sheet having low thermal expansion coefficient, advantageously of an alloy containing 36% Ni, 64% Fe.

In the first phase of assembly the iris plates 13 are placed in their final position between the broad faces 20, 30 of the rectangular wave guide. All the plates have their final dimensions and are provided with the final electroplated coating. The components are kept in position indicated by means of a tool not illustrated here. Development of said tool does not belong to the scope of our invention, however any technician may realize it without difficulties.

The tool is placed with the elements—in the position illustrated in FIG. 4—into the vacuum chamber of the electron beam welding machine and fixed onto the work table. Welding is performed along the arrows E; first of the iris plate 13, is welded through the plate 20, proceeding successively to all irises. Without altering the position of the components the tool is rotated by 180°, and welding of the irises is performed through the plate 30. Side view of the welded unit is to be seen in FIG. 5. The welds 15 and 16 are fixing the plates 20 and 30 respectively. Taking into consideration that said semi-finished unit is sufficiently open for performing electoplating, at an alternate version of the method according to the invention the components can be galvanized in an already welded state.

After having assembled the semi-finished unit the narrower sides 21 and 31 of the rectangular wave guide are fitted into their final positions by means of a tool and placed onto the working table of the welding machine. The weld with the beam emitted in the direction of the arrow E is led along the plates parallel with the plate 20 and 30, respectively. After having performed welding of the plate 21, the welding of the plate 31 is also performed. By performing said operation, the rectangular wave guide cn be considered as finished, the iris sheets 13 are positioned in their correct place.

Figure 7A:
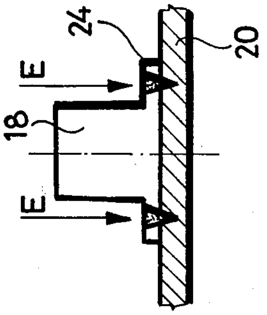
FIG. 7*a* is a section along the line 7—7 of FIG. 7, showing the fixation of the rib holding the tuning screws.
Figure 7:
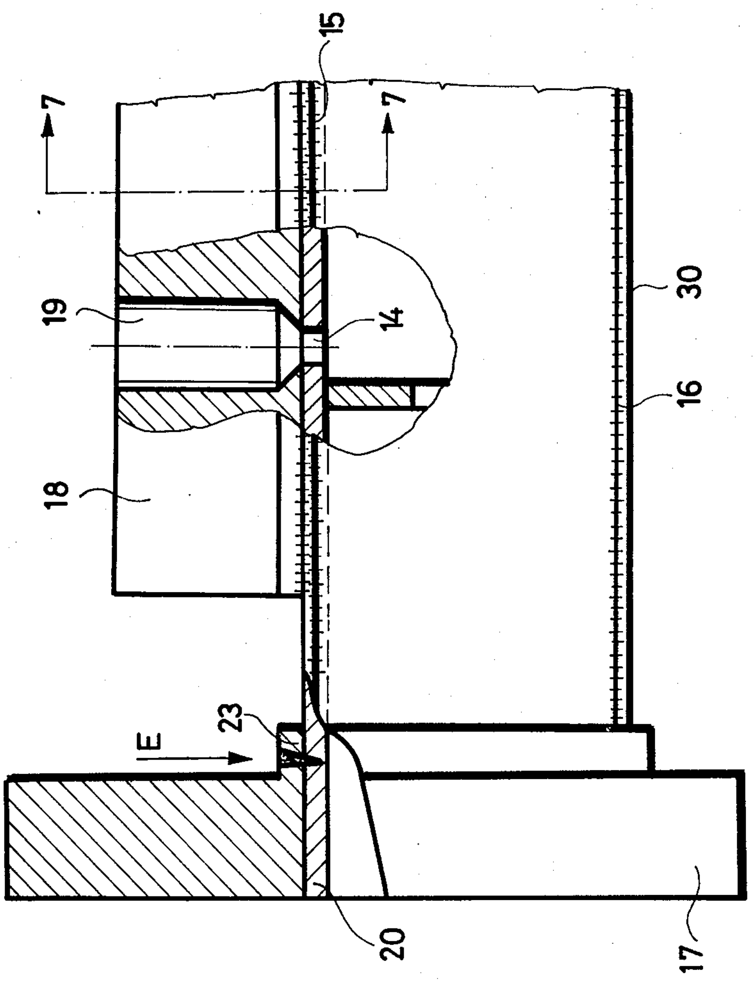
FIG. 7 is a partial elevation of the final welding procedure performed on the microwave filter (partial elevation)

From the plates 21 and 31 at least the last one should be pre-galvanized, since after having welded on said plate, a completely closed inner space will be formed, thus subsequent electroplating becomes nearly impossible. The assembly of the microwave filter is finished by the arrangement of the flanges and the rib holding the tuning screws. In FIGS. 7 and 7*a* said process is to be seen.

On both ends of the wave guide assembled the flanges 17 are positioned. In the middle of the plate 20 the rib 18 holding the tuning screws is arranged; on the rib threaded bores 19, being coaxial with the bores of the plate 20, have been machined. The flanges 17 and the rib 18 are kept in their final position by means of a tool not illustrated here. The tool is placed into the electron beam welding machine and the components are welded by means of the electron beam emitted in the direction of the arrows E. In order to facilitate welding, a tab 23 was formed on the flange 17, whereas on both sides of the rib holding the probe rims 24 were arranged; welding of the flanges is performed by turing the component four times by 90°.

By applying the method according to the invention, not only the filter shown as an example can be assembled in an easy way but any other wave guide element. Compared to the producing technologies used up to now, production becomes much more easier, since the component parts can be produced in their final form directly.

The electron beam welding machines are showing electrical paramteres, which can be kept at constant values or altered in accordance with a preselected programme with the highest accuracy. A co-operation with computerized control systems becomes also possible.

When manufacturing wave guide elements in large series, during a single welding operation several components may be placed simultaneously into the vacuum chamber of the welding maching. As an example we should like to mention the high-output welding machine Type K 6 N/15 K-NC of the company Steigerwald Strahltechnik /München/, the control system thereof comprising a small computer with a memory for storing 4096 or 8192 binary words each having a length of 12 bits.

It goes without saying that the invention is not restricted to any of the examples shown here. For instance, over the copper and silver layers described before, a thin palladium layer, well known in microwave technology, can be applied. The palladium layer will not be damaged by the beam welding process.

What we claim:

1. A method of making a wave guide which comprises the steps of:

forming a plurality of components adapted collectively to constitute a wave guide element and including at least two sheet metal plates formed with electroplated high-conductivity coatings adapted to form a current-conducting surface of the wave guide element the plates having sheet metal sides turned away from said coatings;

assembling said components into a wave-guide configuration with at least two of said plates being disposed adjacent one another and forming a corner of the resulting assembly with the respective coatings in contact with one another; and beam welding said components together at said corner by directing a high energy beam onto one of said plates from the sheet metal side thereof to form at a location spaced outwardly from the region in which said coatings contact a melting pool bridging said plates and thereby welding the same together.

2. The method defined in claim 1 wherein said beam is trained upon said one of said plates in a nonoxidizing atmosphere and is directed parallel to one of the plates.

3. The method defined in claim 2, further comprising melting the coating of the first of said plates in a region at which a second of the plates lies adjacent said first of said plates whereby the coatings of the plates are fused together to form a weld brazed joint.

4. The method defined in claim 1, claim 2 or claim 3 wherein said beam is an electron beam.

5. The method defined in claim 1, claim 2 or claim 3 wherein said beam is a laser beam.

6. The method defined in claim 1, claim 2 or claim 3 wherein said beam is a plasma beam.

7. The method defined in claim 1 wherein said components include electroplated iris-forming members welded to said plates.

8. The method defined in claim 1 wherein said plates are composed of 36% by weight nickel, 64% by weight iron alloy and are electroplated first with copper and then with silver to form said coating.

* * * * *